United States Patent
Mulloni et al.

(10) Patent No.: US 9,667,873 B2
(45) Date of Patent: May 30, 2017

(54) METHODS FOR FACILITATING COMPUTER VISION APPLICATION INITIALIZATION

(71) Applicant: QUALCOMM Incorporated, San Diego, CA (US)

(72) Inventors: Alessandro Mulloni, Vienna (AT); Gerhard Reitmayr, Vienna (AT); Mahesh Ramachandran, San Diego, CA (US); Daniel Wagner, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 14/268,784

(22) Filed: May 2, 2014

(65) Prior Publication Data

US 2014/0327792 A1  Nov. 6, 2014

Related U.S. Application Data

(60) Provisional application No. 61/818,894, filed on May 2, 2013, provisional application No. 61/884,845, filed on Sep. 30, 2013.

(51) Int. Cl.
*H04N 7/18* (2006.01)
*H04N 5/232* (2006.01)
(Continued)

(52) U.S. Cl.
CPC ....... *H04N 5/23296* (2013.01); *G01C 25/005* (2013.01); *G06T 7/73* (2017.01);
(Continued)

(58) Field of Classification Search
CPC .................................................. G06T 7/0042
(Continued)

(56) References Cited

U.S. PATENT DOCUMENTS

| 2007/0297695 A1* | 12/2007 | Aratani ................ G06K 9/3216 382/284 |
| 2008/0292131 A1 | 11/2008 | Takemoto et al. |
| 2013/0234926 A1* | 9/2013 | Rauber ................ G06F 3/0487 345/156 |

FOREIGN PATENT DOCUMENTS

| EP | 1870856 A2 | 12/2007 |
| WO | 2013161182 A1 | 10/2013 |

OTHER PUBLICATIONS

International Search Report and Written Opinion—PCT/US2014/036659—ISA/EPO—Aug. 22, 2014.
(Continued)

*Primary Examiner* — Hung Dang
*Assistant Examiner* — Girumsew Wendmagegn

(57) ABSTRACT

Embodiments disclosed pertain to systems, method s and apparatus for the initialization of Computer Vision (CV) applications on user devices (UDs) comprising a camera and a display. In some embodiments, an optimal camera trajectory for initialization of a Computer Vision (CV) application may be determined based on an initial camera pose and an estimated pivot distance. For example, the initial camera pose may be estimated based on a first image captured by the camera. Further, the display may be updated in real-time with an indication of a desired movement direction for the camera. In some embodiments, the indication of desired movement direction may be based, in part, on a current camera pose and the optimal trajectory, where the current camera pose may be estimated based on a current image captured by the camera.

30 Claims, 11 Drawing Sheets

(51) Int. Cl.
      *G01C 25/00*       (2006.01)
      *G06T 7/80*        (2017.01)
      *G06T 7/73*        (2017.01)

(52) U.S. Cl.
      CPC ........... *G06T 7/80* (2017.01); *H04N 5/23203* (2013.01); *G06T 2207/20092* (2013.01)

(58) Field of Classification Search
      USPC ..................................................... 348/211.8
      See application file for complete search history.

(56) References Cited

OTHER PUBLICATIONS

Mulloni A., et al., "User-Friendly SLAM Initialization," 2013 IEEE International Symposium on Mixed and Augmented Reality (ISMAR), 153-162, Oct. 2013, 10 pages.
Silveira G., et al., "An Efficient Direct Approach to Visual SLAM," IEEE Transactions on Robotics, Oct. 2008, vol. 24 (5), pp. 969-979.
Vidal-Calleja T., et al., "Active control for single camera SLAM," Proceedings of the 2006 IEEE International Conference on Robotics and Automation, May 2006, pp. 1930-1936.

* cited by examiner

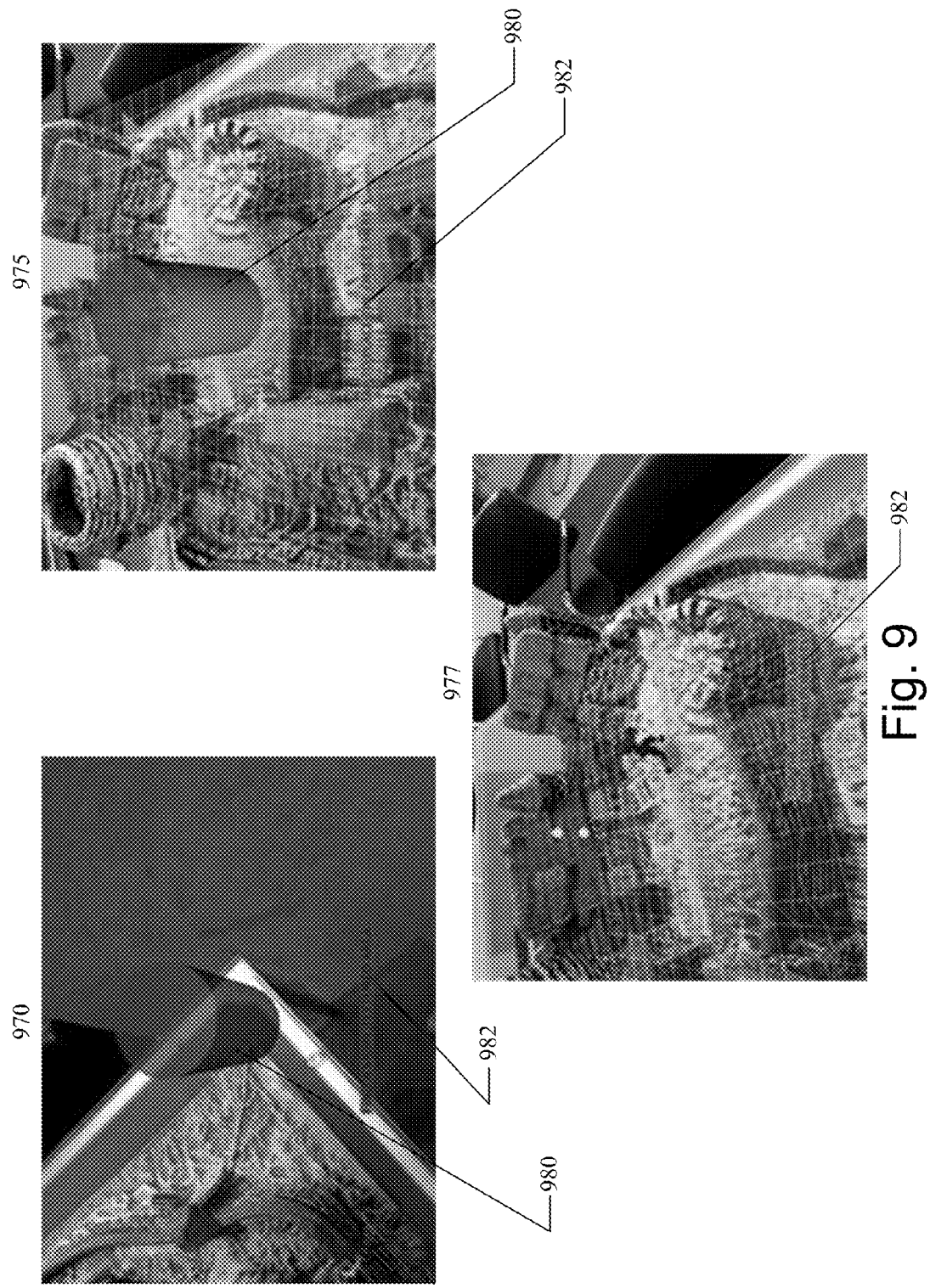

METHODS FOR FACILITATING COMPUTER VISION APPLICATION INITIALIZATION

CROSS REFERENCE TO RELATED APPLICATIONS

This application claims the benefit of and priority to U.S. Provisional Application No. 61/818,894 entitled "Methods for Facilitating Computer Vision Application Initialization" filed May 2, 2013. Further, this application claims the benefit of and priority to U.S. Provisional Application No. 61/884,845 entitled "Methods for Facilitating Computer Vision Application Initialization" filed Sep. 30, 2013. The above-identified U.S. Provisional Patent Applications are incorporated by reference in their entireties herein.

FIELD

The subject matter disclosed herein relates generally to computer vision, and in particular, to methods for initializing computer vision applications.

BACKGROUND

Simultaneous localization and mapping (SLAM) is used in augmented reality systems and robot navigation to build a target from an environment or scene. Visual SLAM (VSLAM) uses camera or visual sensor data or images as input to build a target or model of the environment. When VSLAM used in conjunction with an Augmented Reality (AR) system, virtual objects can be inserted into a user's view of the real world and displayed on a user device.

A tracking system utilizing VSLAM with a single camera may initialize a 3D target from two separate reference images captured by the single camera. Traditional techniques for VSLAM initialization for 3D targets based on two reference images may require users to perform a specific sequence of unintuitive camera motions between the two reference images while simultaneously maintaining adequate overlap between scenes from both images. The sequence of motions is used by 3D reconstruction methods to find a real plane in the environment and initialize the 3D target from this plane.

While the creation of accurate and high-quality SLAM maps relies on a robust initialization process, the usability of SLAM initialization procedures for end-users has often been disregarded. Therefore, there is a need for systems, methods and interfaces to improve the user-experience for VSLAM initialization.

SUMMARY

According to some aspects, disclosed is a method on a user device (UD) comprising a camera and a display. In some embodiments, the method may comprise: determining an optimal camera trajectory for initialization of a Computer Vision (CV) application based on an initial camera pose and an estimated pivot distance, the initial camera pose estimated based on a first image captured by the camera; and updating the display in real-time with an indication of a desired movement direction for the camera, the indication of desired movement direction being based, in part, on a current camera pose and the optimal trajectory, the current camera pose estimated based on a current image captured by the camera.

In another aspect, a user device (UD) may comprise: an image sensor, the image sensor to capture a sequence of images; a display, and a processor coupled to the image sensor and the display. In some embodiments, the processor may be configured to: determine an optimal image sensor trajectory for initialization of a Computer Vision (CV) application based on an initial image sensor pose and an estimated pivot distance, the initial image sensor pose estimated based on a first image captured by the image sensor; and update the display in real-time with an indication of a desired movement direction for the image sensor, the indication of desired movement direction being based, in part, on a current image sensor pose and the optimal trajectory, the current image sensor pose estimated based on a current image captured by the image sensor.

In a further aspect, an apparatus may comprise: image capture means, the image capture means to capture a sequence of images; display means; means for determining an optimal trajectory of the image capture means for initialization of a Computer Vision (CV) application based on an initial pose of the image capture means and an estimated pivot distance, the initial pose of the image capture means estimated based on a first image captured by the image capture means; and means for updating the display means in real-time with an indication of a desired movement direction for the image capture means, the indication of desired movement direction being based, in part, on a current pose of the image capture means and the optimal trajectory, the current pose of the image capture means estimated based on a current image captured by the image capture means.

Further, disclosed embodiments also pertain to a computer-readable medium comprising instructions, which, when executed by a processor, perform a method on a user device (UD) comprising a camera and a display, wherein the method may comprise: determining an optimal camera trajectory for initialization of a Computer Vision (CV) application based on an initial camera pose and an estimated pivot distance, the initial camera pose estimated based on a first image captured by the camera; and updating the display in real-time with an indication of a desired movement direction for the camera, the indication of desired movement direction being based, in part, on a current camera pose and the optimal trajectory, the current camera pose estimated based on a current image captured by the camera.

Embodiments disclosed also relate to software, firmware, and program instructions created, stored, accessed, or modified by processors using computer readable media or computer-readable memory. The methods described may be performed on processors and various user devices.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

FIG. 9 shows an exemplary implementation of a GUI using a 2.5-D representation to select feature rich locations for initialization and/or to prevent the use of poor locations for initialization in a manner consistent with disclosed embodiments.

DETAILED DESCRIPTION

Figure 1:
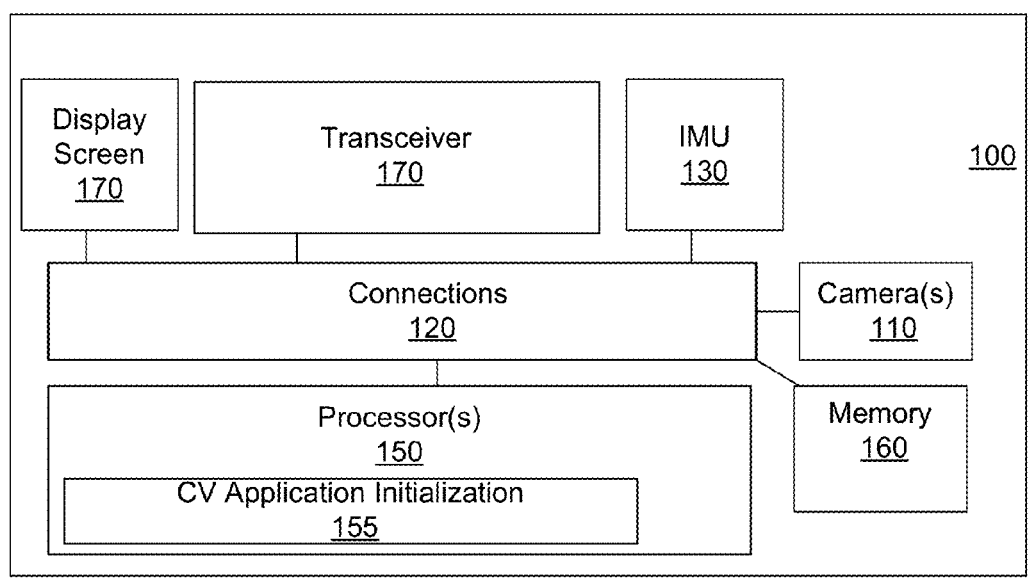
FIG. 1 shows a block diagram of an exemplary user device.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a user device may take the form of an exemplary User Device (UD) 100 and/or other user equipment capable of performing tracking initialization and running AR and other Computer Vision (CV) applications. In some embodiments, UD 100, may take the form of a mobile station or a mobile device, such as a cellular phone, mobile phone or other wireless communication device, personal communication system (PCS) device, personal navigation device (PND), Personal Information Manager (PIM), Personal Digital Assistant (PDA), tablet computer, handheld computing device, laptop or other suitable mobile device capable of receiving wireless communication and/or navigation signals. In some embodiments, UD 100 may take the form of a wearable computing device, which may include a display device and/or a camera paired to a wearable headset. For example, the headset may include a head mounted display (HMD), which may be used to display live and/or real world images. In some embodiments, the live images may be overlaid with one or more virtual objects.

The term "user device" is also used to refer to devices which communicate with a personal navigation device (PND), such as by short-range wireless, infrared, wireline connection, or other connection—regardless of whether satellite signal reception, assistance data reception, and/or position-related processing occurs at the device or at the PND. Also, "user device" is intended to include all devices, including wireless communication devices, computers, laptops, etc. which are capable of communication with a server, such as via the Internet, Wi-Fi, or other network. Any operable combination of the above are also considered a "user device." Embodiments disclosed herein may be used in a standalone user device, for example, in devices that do not require communication with another device.

The term "user device" is also intended to include gaming or other devices that may not be configured to connect to a network or to otherwise communicate, either wirelessly or over a wired connection, with another device. For example, a "user device" may omit communication elements and/or networking functionality. For example, embodiments described herein may be implemented in a standalone device that is not configured to connect for wired or wireless networking with another device.

The term Computer Vision application as used herein refers to a class of applications related to the acquisition, processing, analyzing, and understanding of images. CV applications include, without limitation, mapping, modeling—including 3D modeling, navigation, augmented reality applications, and various other applications where images acquired from an image sensor are processed to build maps, models, and/or to derive/represent structural information about the environment from the captured images. In many CV applications, geometric information related to captured images may be used to build a map or model in an initialization step. Thus, the quality of the model may depend on the trajectory of camera movement and/or the positions of captured images during initialization. In some instances, the CV applications may prefer specific movements or motion sequences to be followed by users during initialization.

Further, the term SLAM is used to refer to a class of techniques where a map of an environment, such as a map of an environment being modeled, is created while simultaneously tracking the pose of a user device relative to that map. The pose of a user device refers to the position and orientation of the user device relative to an image or a frame of reference. SLAM techniques include Visual SLAM (VLSAM), where images captured by a single (monocular) camera, such as a camera on a user device, may be used to create a map of an environment while simultaneously tracking the camera's pose relative to that map. VSLAM may thus involve tracking the 6DOF pose of a camera while also determining the 3-D structure of the surrounding environment. For example, in some embodiments, VSLAM techniques may detect salient feature patches in one or more captured image frames and store the captured imaged frames as keyframes or reference frames. The pose of the camera may then be determined, for example, by comparing a currently captured image frame with one or more keyframes.

Prior to utilizing SLAM/VSLAM or other CV applications, an initialization process is typically performed. For example, a SLAM map may be initialized prior to object tracking and more extensive map building. There are several ways to perform this initialization but the methods can be classified into target-based and target-less initialization techniques. Target-based techniques assume the presence of a known object in the scene, while target-less approaches may work with arbitrary scenes. Although specific exemplary applications such as SLAM/VSLAM are discussed herein, embodiments disclosed herein pertain generally to initialization for CV applications, procedures and/or functions. For example, initialization may be performed for AR applications (e.g. gaming applications), which often depend on robust and transparent tracking.

Typically, target-less initialization techniques are based on performing a sequence of camera motions to make the initialization process converge. For example, for targetless initialization is facilitated when the camera moves in a trajectory that observes the same scene from different viewpoints thereby creating an appropriate baseline between two views that observe a common set of feature points. Typically, the camera motion sequence in targetless approaches facilitates scene observation from different viewpoints, so as to create appropriate overlap between two views that observe a common set of points. However, because the camera motion sequence is unnatural and unintuitive for novice users, the camera may be rotated or moved without observing any subset of scene objects continuously, thereby leading to a small baseline of jointly observed points between views or to a less than optimal number of observed points with sufficient baseline. Baseline relates to the creation of parallax in Computer Vision (CV) and Multiple View Geometry (MVG) algorithms in order to enable triangulation between two views. MVG refers to the use of geometric principles, including epipolar, projective and affine geometry, to determine the 3D structure of an environment from images or views of the environment.

Moreover, despite the counter-intuitive camera motion sequence required for traditional VSLAM initialization, no user-feedback is provided in conventional approaches. Thus, users are confused about both the need for the motion sequence and by attempts to perform the camera motion sequence. To the extent that the user receives any information, in conventional approaches, the information has hitherto been post-facto and limited to a simple exocentric view and/or an iterative reconstruction of the 3D scene. Some techniques such as Parallel Tracking and Mapping (PTAM) may display trails of detected feature points, but such feedback is unintuitive and not useful for ordinary device users to perform the initialization camera motion sequence.

Accordingly, disclosed embodiments, which may be seamlessly integrated with AR applications, facilitate the determination of a camera motion sequence and/or an optimal camera trajectory to facilitate initialization suitable for both users and the tracker. Further, disclosed embodiments may also provide a quality measure/score for the current camera trajectory and interactively guide the user through the execution of the camera motion sequence by providing feedback pertaining to camera motion execution including feedback for motion correction. By facilitating robust and user-friendly initialization, disclosed embodiments increase accessibility, reduce user time and effort, and permit a more optimal AR experience FIG. 1 shows a block diagram of an exemplary UD 100. As shown in FIG. 1, UD 100 may include camera 110, Inertial Measurement Unit (IMU) 130, processor 150, memory 160 and/or transceiver 170, which may be operatively coupled through connections 120. Connections 120 may comprise buses, lines, fibers, links, etc., or some combination thereof.

Transceiver 170 may, for example, include a transmitter enabled to transmit one or more signals over one or more types of wireless communication networks and a receiver to receive one or more signals transmitted over the one or more types of wireless communication networks. Transceivers 110 may facilitate communication with wireless networks based on a variety of technologies such as, but not limited to, Wi-Fi networks or Wireless Local Area Networks (WLANs), which may be based on the IEEE 802.11x family of standards; Wireless Personal Area Networks (WPANs) such as Bluetooth, Near Field Communication (NFC) etc., which may be based on the IEEE 802.15x family of standards; and/or Wireless Wide Area Networks (WWANs) such as LTE, WiMAX, etc.

A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on. Further, UD 100 may also include one or more ports for communicating over wired networks. In some embodiments, the transceiver 170 and/or one or more other ports on user device 100 may be omitted. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

UD 100 may also receive signals from one or more Earth orbiting Space Vehicles (SVs), which may be part of a satellite positioning system (SPS). SVs, for example, may be in a constellation of Global Navigation Satellite System (GNSS) such as the US Global Positioning System (GPS), the European Galileo system, the Russian Glonass system or the Chinese Compass or BeiDou system, and/or a regional satellite system and/or a satellite based augmentation system.

In some embodiments, UD 100 may comprise one or more image sensors such as CCD or CMOS sensors and/or cameras 110, which are hereinafter referred to as "cameras 110". Cameras 110 may convert an optical image into an electronic or digital image and may send captured images to processor 150. In general, cameras 110 may be color or grayscale cameras, which provide "color information." The term "color information" as used herein refers to color and/or grayscale information. In general, as used herein, a color image or color information may be viewed as comprising 1 to N channels, where N is some integer dependent on the color space being used to store the image. For example, an RGB image comprises three channels, with one channel each for Red, Blue and Green information. In some embodiments, camera 110 may be a wearable camera, which may be operationally coupled to, but housed separately from, other functional units in UD 100.

In some embodiments, Cameras 110 may include front-facing and/or rear-facing cameras and may also incorporate CMOS and other visual sensors. In one embodiment, the front facing camera may face the user during normal user operation of the device, while the rear facing camera may face away from the user during normal operation of the device. In some embodiments, cameras 110 may be capable of capturing both still and video images. For example, camera 110 may capture video images at a frame rate of 30 frames per second (fps). In one embodiment, images captured by cameras 110 may be in a raw uncompressed format and may be compressed prior to being processed and/or stored in memory 160. In some embodiments, image compression may be performed by processors 150 using lossless or lossy compression techniques.

In some embodiments, UD 100 may also include display or screen 170, which may be used to display live images captured by camera 110, AR images, Graphical User Interfaces (GUIs), program output, etc. In some embodiments, display 170 may be implemented using a Liquid Crystal Display (LCD) display or variants thereof, a Light Emitting Diode (LED) display, such as an Organic LED (OLED) display or variants thereof, or a heads-up display. In some embodiments, display 170 may be a wearable display such as an HMD, which may be operationally coupled to, but housed separately from, other functional units in UD 100.

Not all modules comprised in UD 100 have been shown in FIG. 1. Exemplary user device 100 may also be modified in various ways in a manner consistent with the disclosure, such as, by adding, combining, or omitting one or more of the functional blocks shown. For example, in some configurations, user device 100 may not include transmitter 170. Further, in certain example implementations, user device 100 may include a variety of other sensors (not shown) such as an ambient light sensor, ultrasonic sensors etc. In some embodiments, UD 100 may include wired or wireless ports to permit the display of images on an external display. In some embodiments, UD 100 may include an inertial measurement unit (IMU), which may comprise 3-axis accelerometer(s), 3-axis gyroscope(s), and/or magnetometer(s). IMU 130 may provide velocity, orientation, and/or other position related information to processor 150. In some embodiments, IMU 130 may output measured information in synchronization with the capture of each image frame by camera(s) 110. In some embodiments, the output of IMU 130 may be used in part by processor 150 to determine a pose of camera 110 and/or UD 100. In some embodiments, portions of user device 100 may take the form of one or more chipsets, and/or the like.

Processors 150 may be implemented using a combination of hardware, firmware, and software. Processors 150 may represent one or more circuits configurable to perform at least a portion of a computing procedure or process related to text detection and tracking and may retrieve instructions and/or data from memory 160. Processors 150 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof. In some embodiments, processors 150 may comprise CV Application Initialization module 155, which may provide functionality related to CV application initialization.

Memory 160 may be implemented within processors 150 and/or external to processors 150. As used herein the term "memory" refers to any type of long term, short term, volatile, nonvolatile, or other memory and is not to be limited to any particular type of memory or number of memories, or type of physical media upon which memory is stored. In some embodiments, memory 160 may hold code and/or data to facilitate image processing, execution of CV/MVG algorithms, including CV Application Initialization, SLAM/VSLAM methods, and other tasks performed by processor 150. For example, memory 160 may hold data, captured still images, video frames, program results, as well as data provided by various sensors. In general, memory 160 may represent any data storage mechanism. Memory 160 may include, for example, a primary memory and/or a secondary memory. Primary memory may include, for example, a random access memory, read only memory, etc. While illustrated in FIG. 1 as being separate from processors 150, it should be understood that all or part of a primary memory may be provided within or otherwise co-located and/or coupled to processors 150.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium in a removable media drive (not shown) coupled to user device 100. In some embodiments, non-transitory computer readable medium may form part of memory 160 and/or processor 150.

User device 100 may also include software to process images captured by camera 110. For example, processor 150 may be capable of executing CV/MVG programs, running programs to detect features in images, perform image registration, and running AR programs using one or more images captured by camera 110. In many Augmented Reality (AR) applications, for example, one or more virtual objects may be superimposed over a live camera view. Accurate registration of virtual objects can ensure correct placement of virtual objects in live video imagery when rendering the virtual object. Registration, image registration or image alignment refers to the process of transforming and/or integrating different data sets into a single coordinate system.

When running AR applications, for example, processor 150 may place a virtual object into a live camera view and the virtual object may be rotated and/or displaced in a captured image to correspond to the pose of the camera. The pose of a camera refers to the position and orientation of the camera relative to an image or a frame of reference. In some embodiments, one or more features in an image may be used to determine the pose of the user device and/or camera relative to the image. In some embodiments, the pose of camera 110 relative to an image may be determined or corrected based, in part, on input from IMU 130. In some embodiments, known intrinsic parameters and characteristics of camera 110 such as the focal length of the lens, camera focus distance etc. may be used in conjunction with the IMU and/or input from other sensors to assist with and/or refine camera pose determination.

In Monocular SLAM systems, which use a single camera, features such as points or lines may be triangulated between two frames with known camera pose. Camera pose can be obtained by tracking an initial reference target, and/or by estimating the relative motion using epipolar geometry between two frames. Epipolar geometry, which pertains to geometric relationships between 3D points that are viewed from two distinct camera positions and their projections onto 2D images, can be used to determine constraints between image points.

To estimate the relative motion between two frames, a set of point correspondences or similar features is used and adequate overlap between the two frames facilitates the reliable establishment of correspondences. Moreover, accurate triangulation between corresponding points or features in the two frames is facilitated by appropriately large triangulation angles between the two camera centers and the 3D points. To facilitate obtaining feature point correspondences, many CV applications that use and/or invoke SLAM based techniques present users with an explicit initialization step. In some embodiments, CV application initialization may be performed, at least in part, by CV Application Initialization module 155.

For example, an initial keyframe may be manually selected, while the system may track correspondences in a current video frame using a feature tracking algorithm such as the Kanade-Lucas-Tomasi (KLT) algorithm, variants thereof, or any other suitable feature correspondence technique. The correspondences may, for example, be determined between a first suitable captured video frame and the current video frame. Simultaneously, the system may estimate the epipolar geometry and triangulate the 3D points in the scene. If successful, the system is initialized with this set of 3D points, and tracking and mapping proceeds with this initial map. Other related approaches maximize some measure of the relative motion estimation quality. In some embodiments, CV Application Initialization module 155 may be implemented by some combination of hardware, software, and/or firmware.

Figure 2A:
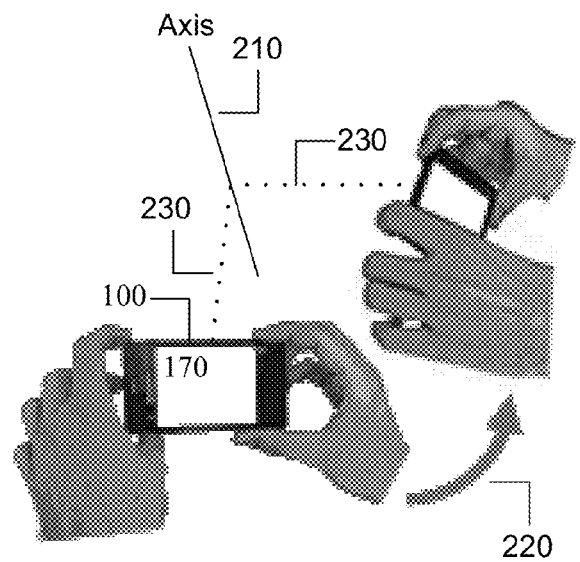
FIGS. 2A and 2B show exemplary motions of a camera to facilitate SLAM/VSLAM initialization.
Figure 2B:
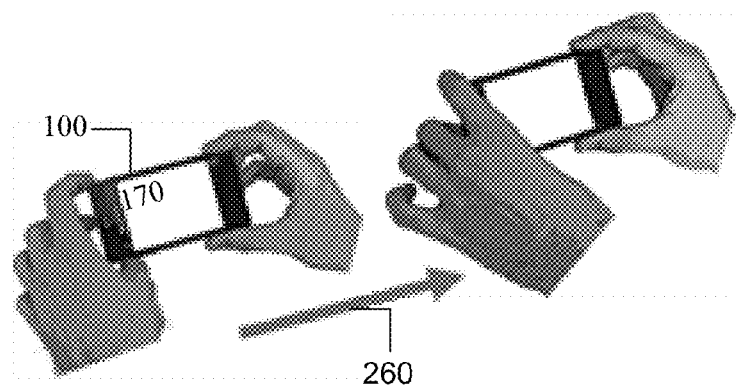

FIGS. 2A and 2B show exemplary motions of camera 110 on UD 100 to facilitate CV Application initialization, which may comprise SLAM/VSLAM initialization.

As shown in FIG. 2A, SLAM initialization 200 may be facilitated when camera 110 (not shown in FIG. 2A) on UD 100 rotates around a target or object, termed a pivot. The pivot motion sequence 220, as used herein, refers to approximately circular movement around an object axis 210 at some pivot distance 230. Pivot movement sequence 220 may be realized, for example, by moving a camera in a circle while looking at an object placed at the center. Pivot distance 230, in the example above, is the radius of the circle.

During pivot motion sequence 220, images captured by camera 110 may be displayed on display 170. Further, during the pivot motion sequence, all feature points may remain continuously in view and can be tracked, and a large baseline is typically reached by the end of the pivot motion sequence.

As shown in FIG. 2B, SLAM initialization 250 is also facilitated when camera 110 is moved in sideways translational motion sequence 260, which also facilitates tracking During the sideways translational motion sequence images captured by camera 110 may be displayed on display 170. Further, during the sideways translational motion sequence 260, many of the initial feature points will still be in view by the end of the sideways translational motion sequence, especially when the baseline is not too large.

While pivot motion sequence 220 and translational motion sequence 260, as shown FIGS. 2A and 2B, respectively, are both useful for SLAM initialization, the pivot motion sequence is relatively more complicated to explain and may involve greater dexterity to perform. On the other hand, the sideward translational motion sequence is simpler for a user to perform, while providing adequate information to a tracker.

Typically, novice users may have difficulty following one or more of the trajectories described above and may move camera 110 without continuously observing any subset of scene objects. An incorrect or poorly executed motion sequence may lead to failures when initializing a SLAM system. Thus, embodiments described may enable determination of a camera motion sequence to facilitate initialization suitable for both users and the tracker. In some embodiments, a quality measure/score for the current camera trajectory may also be provided. In some embodiments, the user may further be interactively guided to follow a desirable trajectory for initialization.

In some embodiments, during the initialization process, to determine the current pose/trajectory of the device and/or to provide feedback on the current and/or desired trajectory, CV Application Initialization module 155 may receive input from a tracking system that provides a coarse estimate of the relative motion (e.g. the 3D translation and rotation) of the camera 110 between an initial starting frame and the current video frame with 6DOF before the SLAM system is initialized. For example, in one embodiment, instant or rapid camera tracking from a first reference image (e.g., a first image such as an initialization image captured by camera 110) may be used, at least in part, by processing the first reference image and calculating a set of extracted interest points using an initial estimated depth. For example, for a 3D target, the dataset for the 3D target may be fully populated with depth and location for all interest points from the first single reference image based on the estimated depth. In one embodiment, all points detected in the first keyframe may be set to have a distance of unity from the camera center. Any errors in depth may be corrected as the camera pose changes with respect to the 3D target. For example, the tracking system may automatically select parts (e.g., interest points) of a scene (e.g., a 3D map) that may be updated given the observed motion of camera 110. In another embodiment, the estimate of relative motion may be based, in part, on additional input provided by IMU 130. Thus, the tracking system may provide continuous tracking of camera 110 from the first reference image onwards. The tracking system and other aspects are described, for example, in "User friendly SLAM initialization," by A. Mulloni, M. Ramachandran, G. Reitmayr, D. Wagner, R. Grasset, and S. Diaz, in 2013 IEEE International Symposium on Mixed and Augmented Reality (ISMAR), 153-162, October 2013, which is hereby incorporated by reference in its entirety.

The continuous tracking of camera 110 may be used, in part, to compute the current pose of the camera and/or determine the trajectory followed by camera 110. For example, in some embodiments, CV Application Initialization module 155 may determine a desirable next position to be reached by camera 110, based, at least in part, on the initial camera pose, the estimated current camera trajectory, and the current camera pose. Further, in some embodiments, CV Application Initialization module 155 may provide a quality measure/indicator and/or a quality score for a current camera trajectory followed by the user. In addition, in some embodiments, CV Application Initialization module 155 may provide an interactive visualization using display 170 to guide users to correct the current trajectory, follow a desired trajectory and provide interactive feedback on the quality of the trajectory followed.

In some embodiments, CV Application Initialization module 155, which may perform SLAM initialization, may comprise two components, which, in some instances, may form part of an integrated application. In one embodiment, a tracking system that initializes a SLAM map as soon as a sufficient baseline between two keyframes has formed may form one component. A user interface that interactively facilitates the performance of camera motion sequences to provide sufficient baseline in an area providing detail for the tracking system (e.g. a feature rich area) may form another component.

In some embodiments, CV Application Initialization module 155 may determine a desirable next position to be reached by UD 100, given its initial position, its current position. In some embodiments, CV Application Initialization module 155 may further determine a quality score for the current trajectory followed by the user. In some embodiments, CV Application Initialization module 155 may also provide an interactive visualization to guide users to correct the current trajectory and/or follow a desired trajectory.

The 6-Degree of Freedom (6DOF) relative motion of camera 110 with respect to its initial position may be described by a 4×4 matrix C with the following structure $$C = \begin{pmatrix} R_{3x3} & t \\ 0_{1x3} & 1 \end{pmatrix} \quad (1)$$

where R is a 3×3 rotation matrix and $t=[t_x, t_y, t_z]^T$ is a 3 vector describing the translation and the superscript "T" represents the transpose of t.

For a rotation around a pivot with pivot distance d>0 in front of the device, any pose of camera 110 for an optimal trajectory satisfies the constraint $$C = \begin{pmatrix} R & (I-R) \cdot D \\ 0 & 1 \end{pmatrix}, \text{ where } D = \begin{pmatrix} 0 \\ 0 \\ d \end{pmatrix} \quad (2)$$

Based on the above formulation, it may be determined whether pose C is a rotation around the desired pivot by verifying if $$t \cdot (I-R)^{-1} \sim D \quad (3)$$

In some embodiments, the value of $[t \cdot (I-R)^{-1}]-D$ may be checked to determine if it falls within some predetermined constraints or within a range of some selected value.

In general, the pivot distance d may be selected based on various criteria. For example, pivot distanced may be selected as an arbitrary value such that d>0 (e.g. d=1). In some embodiments, pivot distance d may be selected based on the average distance of observed feature points from the camera 110 and/or UD 100. In some embodiments, pivot distanced may be selected as an arbitrarily large value above some fixed threshold. When larger values of pivot distanced are used, the trajectory approximates a sideward translation. Accordingly, sideward translation may be modeled by selecting an appropriately large value of pivot distance d.

Given the above formulation, the 6-dimension vector representing the logarithm (log) of the device motion $C_i$ at time i is given as $$v_i = \log(C_i)[t_x, t_y, t_z, r_x, r_y, r_z] \quad (4)$$

where $\log(C_i)$ is logarithm of the SE(3) represented by the transformation matrix $C_i$ and the desirable next position on the trajectory may be obtained as an incremental motion ($\Delta \hat{v}_{i+1}$) that follows/continues on the same desired trajectory $$\Delta \hat{v}_{i+1} = \alpha \cdot \log(C_i) \quad (5)$$

with α>0 to ensure forward motion. The term SE(3) refers to the 6-parameter Special Euclidean Group (3) with 6 degrees of freedom (6DoF), where, as noted above, three parameters $t_x, t_y, t_z$ correspond to the 3D translation vector and three parameters $r_x, r_y, r_z$ correspond to the rotation vector.

The SE(3) group has a corresponding Lie algebra se(3), whose bases are six 4×4 matrices, each matrix corresponding to either infinitesimal rotations or infinitesimal translations along each axis. The logarithm maps, such as indicated by equation (4) above, transform elements between Lie groups and their corresponding Lie algebras. Details on the logarithm map may be obtained from "A tutorial on SE(3) transformation parameterizations and on-manifold optimization," Jose-Luis Blanco, Technical report #012010, May 9, 2013, ETS Ingenieria Informatica, Universidad de Malaga, Campus de Teatinos s/n—29071 Malaga, Spain, which is hereby incorporated by reference herein, in its entirety.

Following the current trajectory will move camera 110/UD 100 further around the pivot, keeping both the scene in view as well as extending the angle to the initial position. Therefore, equation (5) may be used to determine an optimal and/or desirable direction for movement of camera 110/UD 100.

In some embodiments, the proportionality factor α may also be used to calculate a quality measure for the latest user-performed motion $\Delta v_{i+1}$ by comparing the actual user trajectory to the desired trajectory. For example $\Delta v_{i+1}$ may be estimated from the actual device motion and compared to the trajectory established so far.

In one embodiment, for a motion in the same direction, the quality measure may be determined based on the magnitude of $\langle v_i, \Delta v_{i+1} \rangle$ (larger is better), where $\langle v_i, \Delta v_{i+1} \rangle$ represents the inner product of $v_i$ and $\Delta v_{i+1}$. In another embodiment, the quality measure may be based on the degree of Normalized Cross Correlation (NCC) between vectors $v_i$ & $v_{i+1}$, given by NCC($v_i, \Delta v_{i+1}$). In one implementation, NCC($v_i, \Delta v_{i+1}$) may be obtained as the dot product of $\langle v_i, \Delta v_{i+1} \rangle$ divided by std deviation of vectors $v_i$ & $v_{i+1}$. For example, the motion may be considered of higher quality or assigned a better quality measure if NCC ($v_i, \Delta v_{i+1}$) is closer to 1 (i.e. a NCC value closer to 1 implies a better quality of motion).

In some embodiments, instructions for user movement in a desired trajectory based on pivot distance d, the logarithm of camera motion at time i $v_i$, and desirable next position $\Delta v_{i+1}$ on the trajectory may be presented interactively through display 170 on UD 100. Further, in some embodiments, the instructions may provide continuous feedback pertaining to expected or desired movement of UD 100/Camera 110. In some embodiments, the GUI may provide a visualization indicating the current movement of UD 100/Camera 110 and/or the movement of UD 100/Camera 110 from the start of the initialization process. In some embodiments, the interactive feedback may provide information about temporal and spatial aspects (e.g., start, end, current progress status). In the embodiments described below, instructions for user movement in a desired trajectory may be based on d, $v_i$, $\Delta v_{i+1}$ and may be presented interactively to the user using interfaces on UD 100.

Visual guidance can be more intuitive because user-instructions and motion may be indicated in a single unified coordinate frame. On the other hand, the use of screen displays may involve greater user-dexterity and coordination because UD 100/camera 110/display 170 may be moved while simultaneously looking at the image displayed the screen. Therefore, in some embodiments, various other modalities such as audible, or tactile (e.g. using vibro-tactile actuators) for providing feedback may be used. For example, voice commands and/or audible sounds may be used to provide feedback. In some embodiments, UD 100 may vibrate when the user deviates by some threshold from the optimal trajectory. For example, audio volume, frequency, and/or the degree of vibration may be varied based on the extent of deviation of UD 100/camera 100 from the optimal trajectory. In some embodiments, the audible and/or tactile feedback may be provided in addition to visual indications on display 170. In some embodiments, the feedback provided may also include an indication of quality of the performed motion sequence, for example in textual or in pictorial form.

In some embodiments, a GUI may be used to help users interactively perform the sideways translational and/or pivot motion sequence. In some embodiments, various GUI implementation may be used to provide guidance such as, but not limited to, Screen-aligned 2D guidance, Screen-aligned 3D guidance, World aligned 3D guidance, etc. which are described further below.

In some embodiments, Screen-aligned 2D guidance may use 2D screen-aligned UI elements to provide an indication of the motion sequence, while explaining the motion sequence and interactively guiding the user. For example, in one embodiment, when performing a sideward translational motion sequence, a level indicator or an artificial horizon may be used to indicate the extent of rotation and may facilitate performance of the appropriate translational motion. When the user introduces too much rotation to the motion the level indicator signals it to the user.

Figures 3A, 3B:
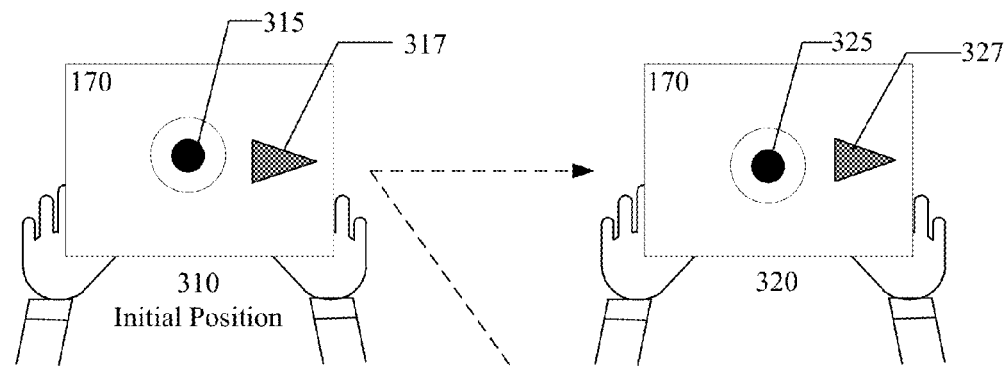
FIGS. 3A-3C show views of an exemplary GUI using 2D screen aligned UI elements to provide an indication of the SLAM initialization motion sequence in a manner consistent with disclosed embodiments.
Figure 3C:
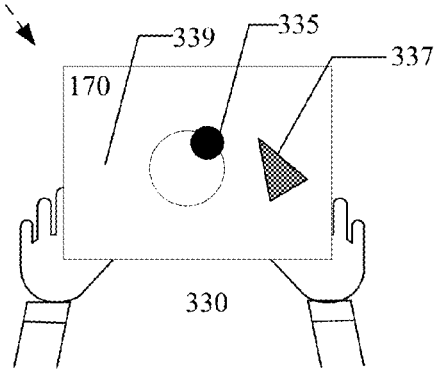

FIGS. 3A-3C show views of an exemplary GUI using 2D screen aligned UI elements to provide an indication of the SLAM initialization motion sequence. As shown in FIG. 3A, in one implementation, a 2D screen-aligned cursor 317 may be shown on display 170 on UD 100. In some embodiments, display 170 may simultaneously show images captured by camera 110 and cursors 317, 327 and 337 may be overlaid over the displayed image. Note that in FIGS. 3-7 some elements have not been drawn to scale and may have been exaggerated for clarity.

In FIG. 3A at initial position 310 of UD 100, cursor 317 may be level and point in the direction of the sideward translational motion to be executed (e.g. the horizontal axis of the cursor may be aligned to the edge of screen 170) based on the determined desired trajectory. In some embodiments, a further indication of position/trajectory may be provided by bullseye indicator 315, which is shown centrally located within the circle. In FIG. 3B, at position 320, if the sideward translational motion has been correctly executed within some tolerance criteria, cursor 327 may continue to point in the direction of the sideward translational motion and bullseye indicator 325 may be centrally located. On the other hand, as shown in FIG. 3C, if the motion has been incorrectly executed, for example, because of rotation of the device by the user at position 330, then cursor 337 may be oriented to point in a direction to counter the user's prior incorrect rotational motion and bullseye indicator 335 may move off-center.

Various other 2D screen aligned UI elements may be used instead of or in addition to the cursor/bullseye. For example, a dashed line, an artificial horizon, etc may be used. In some embodiments, the UI elements may be displayed at a corner of the screen or at another unobtrusive location. In some embodiments, the user may be able to configure the type of UI element, its location on the screen, color, and effects such as blinking, audio/tactile effects, etc. In some embodiments, instructions may be provided using audible voice/multimedia instructions. For example, the user may be given voice instructions to move right (or left), or may be warned that the trajectory is diverging from the desired trajectory and/or provide instructions to correct the current trajectory. In some embodiments, the voice instructions may be provided in conjunction with a graphical or pictorial warning on display 170. In some embodiments, the initialization or AR application invoking the initialization procedure may have default settings for UI elements during initialization.

Figures 4A, 4B:
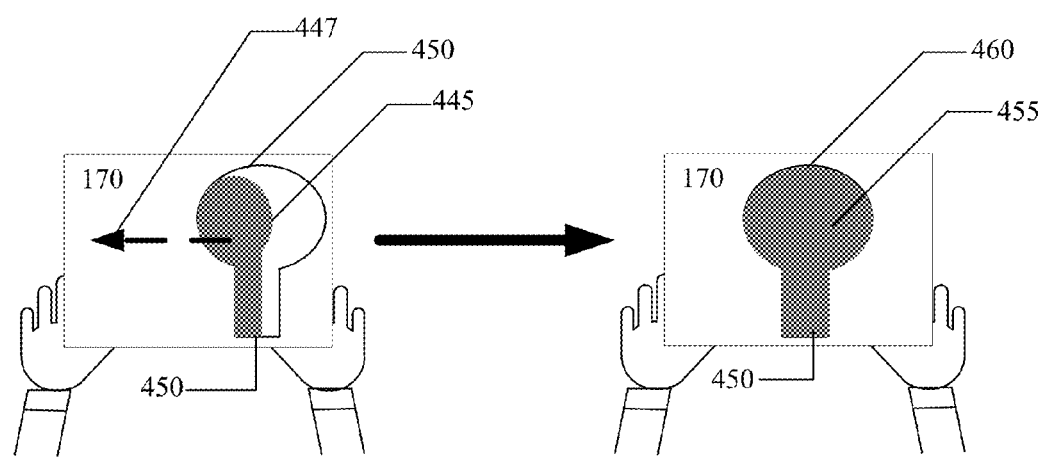
FIGS. 4A-4B show views of an exemplary GUI using 3D screen aligned UI elements to provide an indication of the SLAM initialization motion sequence in a manner consistent with disclosed embodiments.

FIGS. 4A-4B show views of an exemplary GUI using 3D screen aligned UI elements to provide an indication of the SLAM initialization motion sequence. In some embodiments, the 3D elements may further user movement in a manner that facilitates baseline creation. Baseline creates parallax in CV/MVG algorithms in order to enable triangulation between two views. As a consequence of parallax some parts of the scene in one view are occluded in another view. Thus, parallax can be exploited to further the translational or pivoted movement required to initialize SLAM trajectory based on parameters $d$, $v_i$, $\Delta v_{i+1}$.

In one embodiment, a desirable motion for the purpose of SLAM initialization may be obtained by graphically communicating to the user to move UD 100 in a manner that creates scene occlusion as seen by the moving camera. For example, in one embodiment, the user may be directed to look behind an occluding object, look through a virtual keyhole, or use another parallax effect that would encourage sideward translational movement.

As shown in FIG. 4A, dashed arrow 447, and obscured object 445 in keyhole 450 may be shown to the user in an exemplary GUI for 3D screen-aligned guidance. As shown in FIG. 4A, keyhole 450 is near an edge of screen 170. Arrow 447 may indicate the direction of movement and the user may execute a sideward translational motion sequence with UD 100 so that, as shown in FIG. 4B, previously obscured object 445 is now fully visible as object 460 in keyhole 455, which is now located more centrally on screen 170.

In another embodiment, the image on display 170 may be augmented with two objects at different depths using an approximate pose obtained from the first frame. Both augmented objects may be made visible to the camera in a first view and 3D scene aligned GUI elements may be used to indicate a direction of movement for UD 100 so that the first augmented object is kept in view while the second augmented object is gradually hidden behind the first augmented object as a consequence of the movement.

In a further embodiment, the image on display 170 may be augmented with two objects at different depths using an approximate pose obtained from the first frame. The second augmented object may be hidden behind the first object i.e. the first augmented object occludes the second augmented object in the initial camera view when the initialization application starts. 3D scene aligned GUI elements may be used to indicate a direction of movement for UD 100 so that the second augmented object is gradually made visible, while keeping the first augmentation in view.

In some embodiments, the scale of augmented objects may be dynamically increased and/or decreased according to a mean or median baseline angle reported by the initialization tracker. Accordingly, the extent of disocclusion or occlusion may be proportional to the magnitude of the baseline angle for scene points. The occlusion/disocclusion resulting from the dynamic scaling of augmented objects creates an effect whereby augmented objects move away from the user if the augmented objects is rendered at an initial nearby depth but the scene points are farther off. Thus, a motion sequence relative to true scene depth is encouraged.

In another embodiment, incentives or feedback may be provided within an application based on the amount of baseline angle. For example, depending on the angle, the liveliness of augmented objects can be increased. The interactivity of augmented objects may depend on the direction of the executed motion sequence. For example, a pivot motion sequence may be encouraged by displaying an augmented object in a manner so that the user is likely to perform the pivot motion sequence to see the face of the augmented object.

Figure 5A:
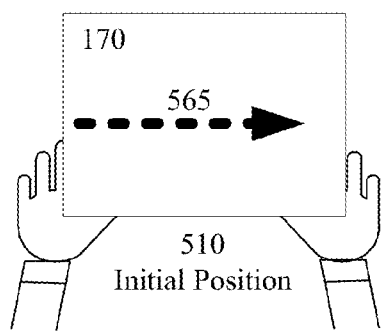
FIGS. 5A-5C show views of an exemplary GUI using 3D screen aligned UI elements to provide an indication of a SLAM initialization motion sequence in a manner consistent with disclosed embodiments.
Figure 5B:
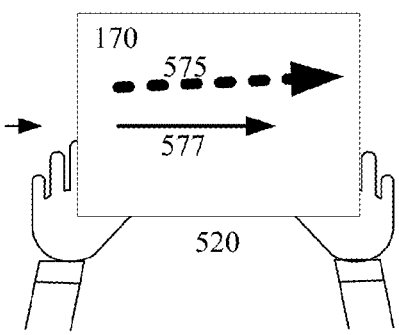
Figure 5C:
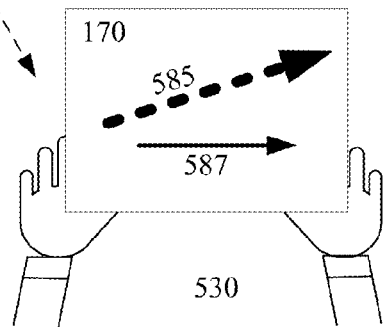

FIGS. 5A-5C show views of an exemplary GUI using 3D screen aligned UI elements to provide an indication of a SLAM initialization motion sequence. As shown in FIG. 5A, dashed arrow 565, may be shown to the user in another GUI for a 3D screen-aligned guidance using display 170. Arrows 565, 575 (FIG. 5B) and 585 (FIG. 5C) may indicate a direction of movement representing a "shadow" or "ghost" trace of the correct motion sequence. In one embodiment, 3D graphics such as dashed arrows 565, 575 and 585 may indicate a direction for executing the motion sequence. In FIG. 5B at position 520, where the motion has been executed correctly within some tolerance parameter, arrow 577 indicating the motion of UD 100 and arrow 575 indicating a correct direction for further execution of the motion sequence are almost parallel. In FIG. 5C at position 530, where the motion has been executed incorrectly, dashed arrow 585 indicating the correct direction of motion of UD 100 and arrow 587 indicating the motion of UD 100 are divergent. In some embodiments, the arrows 577 and/or 587 may be color coded based on a quality measure to indicate the quality of motion sequence execution by the user.

Figure 6A:
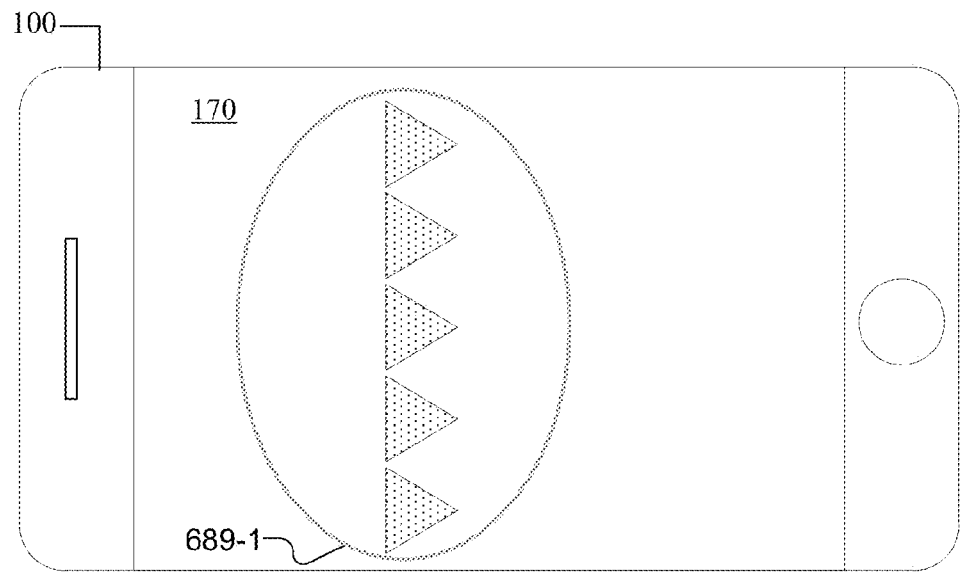
FIGS. 6A and 6B show views of an exemplary GUI using 3D screen aligned UI elements to provide an indication of the SLAM initialization motion sequence in a manner consistent with disclosed embodiments.
Figure 6B:
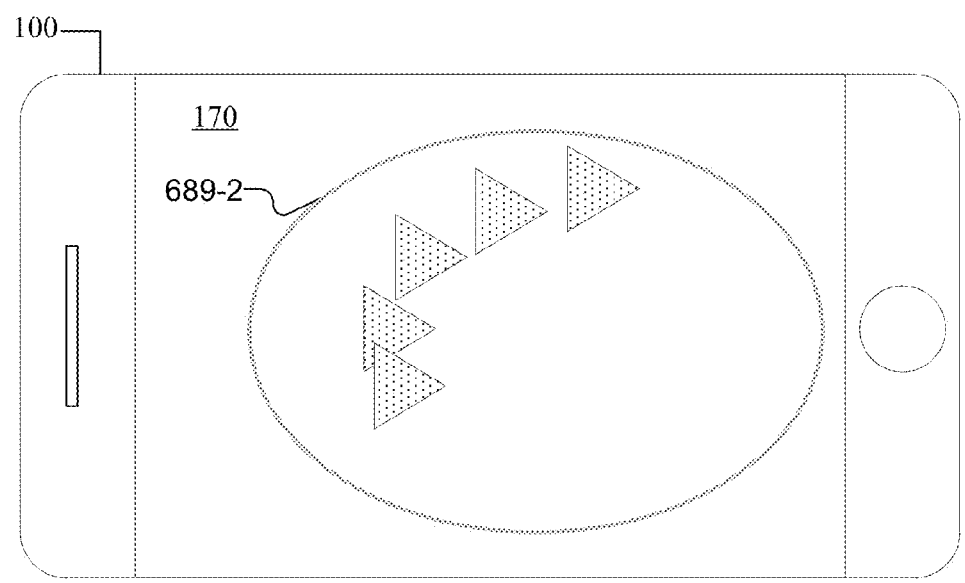

FIGS. 6A and 6B show views of an exemplary GUI using 3D screen aligned UI elements to provide an indication of the SLAM initialization motion sequence. As shown in FIG. 6A, a flock of birds (shown as triangles in FIGS. 6A and 6B) 689-1 is shown moving along the desired/optimal trajectory; if the user diverges from the trajectory, the motion of the flock of birds 689-2 may be modified to guide the user to follow the desired/optimal trajectory.

Figure 7:
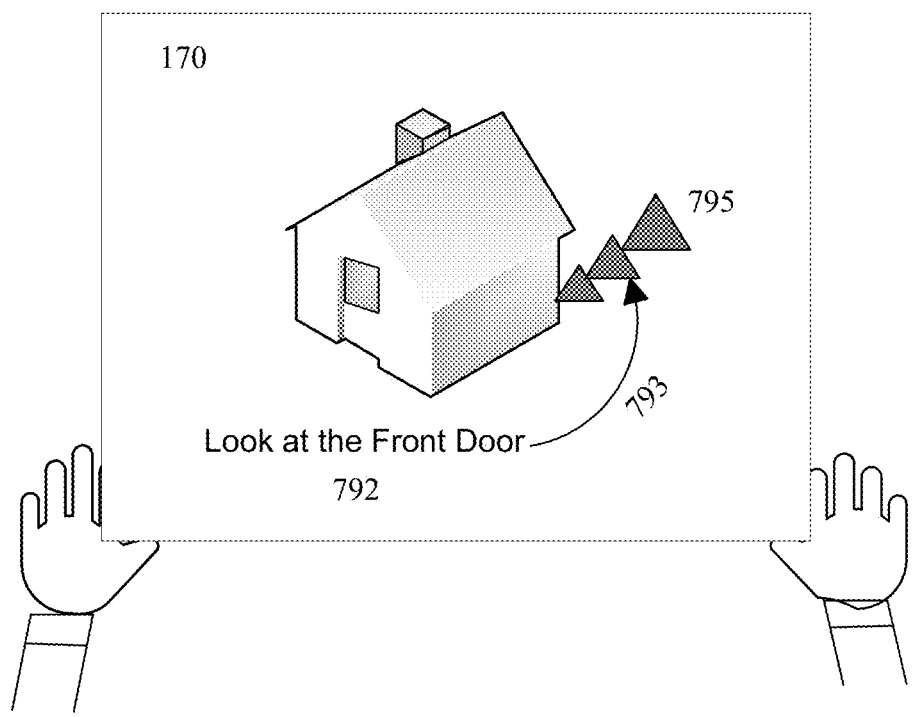
FIG. 7 shows an embodiment of an exemplary GUI using 3D world aligned UI elements to provide an indication of the motion sequence in a manner consistent with disclosed embodiments.

FIG. 7 shows an embodiment of an exemplary GUI using 3D world aligned UI elements to provide an indication of the motion sequence. In some embodiments, 3D elements embedded in the environment may be shown along with hints directed toward execution of the desired motion sequence. For example, in one implementation, as shown in FIG. 3D, a 3D house may be shown on display 170 on UD 100 with a suggestion 792 to "Look at the Front door" and/or another UI element. In some embodiments, the perspective of the house shown, suggestion 792, UI elements 793 and 795 may indicate a pivot motion sequence that induces the user to pivot UD 100 in order to see the main door while keeping the house in view.

In another embodiment, a 3D character facing away from the user may be displayed on the other side of a table so that to look the character in the eyes, a pivot motion sequence around the table is evoked. In another embodiment, an interactive menu of the application may be used, for example, a pivot motion sequence around the table may be used prior to permitting user-selection of the correct menu item. In a further embodiment, a mini-game may be presented that suggests the motion, for example, by asking the user to collect different virtual items positioned on a predesigned trajectory. In some embodiments, the mini-game may be presented with a theme corresponding to the AR application that invokes the initialization routine.

Figure 8A:
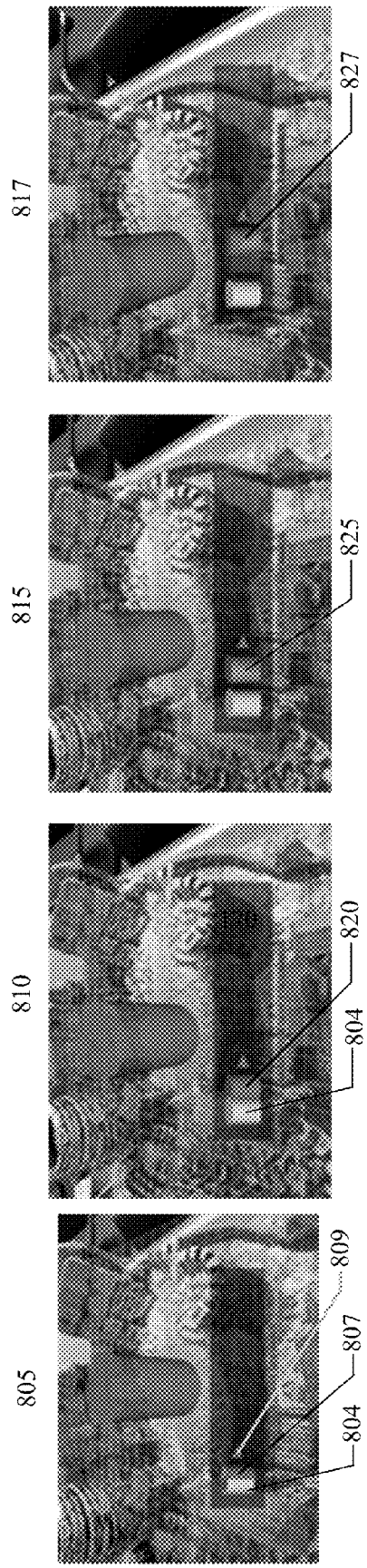
FIGS. 8A and 8B show an exemplary implementation of a GUI using a 2.5-D representation of aligned UI elements in a manner consistent with disclosed embodiments.
Figure 8B:
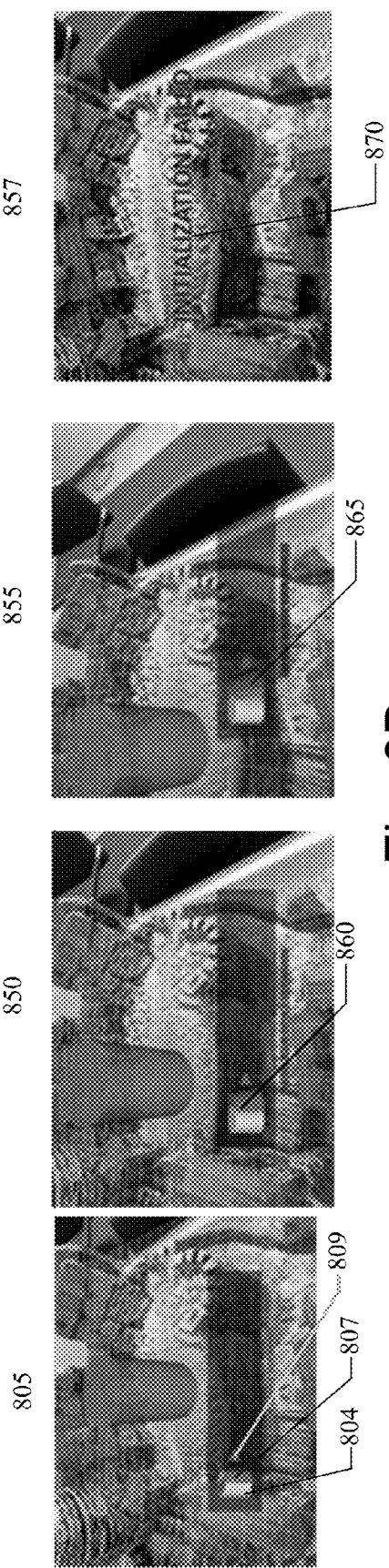

FIGS. 8A and 8B show an exemplary implementation of a GUI using a 2.5-D representation of aligned UI elements. The term 2.5-D is used to refer to graphical projections and/or other techniques that simulate the appearance of 3-D in an image sequence. A 2.5-D representation may facilitate end-user simplicity while permitting a reasonable amount of information to be shown. Further, as shown in FIG. 8A, the 2.5D GUI may permit visualization of the horizontal or sideward translational motion sequence and the pivot motion sequence.

In FIGS. 8A and 8B, GUI view 805, the interface shows the initial position of the device represented by light object 804 and the current position of the device shown as dark object 807. Note that the color of the object indicating the device may change from dark to light (or from a first color to a second color) and vice versa depending on the execution of the motion sequence. Animated arrow 809 indicates the direction the user should move the device.

In FIG. 8A, GUI views 810, 815 and 817 show a sequence of images where the motion sequence has been executed correctly, while, in FIG. 8B, GUIs 850, 855 and 857 show a sequence of images where the motion sequence has been executed incorrectly. As shown in FIG. 8A, in GUI view 810, the initial position 804 of the UD 100 is shown by the light object and the current position 820 of UD 100 is shown by dark object. As can be seen by comparing GUI views 805, 810, 815 and 817, UD 100/Camera 110 has moved from its initial position 807 to positions 820, 825 and 827 in the direction indicated by animated arrow 809. The orientation of the object in the visualization interactively matches the device's movements. Thus, in GUI views 810, 815 and 817 where the motion sequence has been executed correctly, the green object at positions 820, 825 and 827 is vertical.

In FIG. 8B, as shown in GUI view 850 where the motion sequence has been incorrectly executed, at position 860, the dark object is shown inclined at a first orientation because the rotation may be within a tolerance level. In GUI view 855, the rotation of UD 100 exceeds the permitted tolerance, therefore, at position 865 the color of the object has changed and the inclination has increased. Finally, in GUI view 857, message 870 indicates a failure of initialization on account of incorrect execution of the motion sequence. The GUI design using a 2.5-D representation of aligned UI elements, shown in FIGS. 8A and 8B communicate full 3 Degrees Of Freedom warnings in case of rotational motions and interactively reacts to users' motion correction.

FIG. 9 shows an exemplary implementation of a GUI using a 2.5-D representation to select feature rich locations for initialization and/or to prevent the use of poor locations for initialization. As shown in FIG. 9, in GUI 970, when camera 110 on UD 100 is pointed at a poor location for initialization, augmented cylindrical object 980 may change color (e.g. to red). In GUI 975, camera 110 on UD 100 is pointed at a good location for initialization and augmented cylindrical object 980 may turn a different color (e.g. to green). The color of bar 982 indicates when initialization is complete and the AR application can be run. In FIG. 4B, the augmented cylindrical object is shown to illustrate the functioning of the GUIs. In general, any 3D object, such as a 3D character or object used in an end-application may be used.

In some embodiments, the initialization techniques described above may be used in conjunction with a tracking system that is capable of providing instant or fast real-time 6DOF tracking without any prior knowledge on the scene, using image sequences from a monocular camera. Additional details for an exemplary tracking system capable of being used in conjunction with the above initialization techniques are provided below. In general, the initialization routine may be used with SLAM/VSLAM or with other systems, including AR systems or other computer-vision systems, functions, and/or applications where user camera movements are used by the underlying process.

The tracking system may work by tracking 2D points from an initial keyframe and jointly optimizing the 3D point locations and relative camera pose (termed mini-bundle adjustment) for each successive frame, with respect to the initial keyframe. The tracking system may therefore be well suited for pose tracking from application startup till the SLAM/VSLAM system has successfully initialized its map. Bundle adjustment refers to simultaneous refinement of (i) 3D coordinates describing a scene geometry in a set of images depicting a number of 3D points from different viewpoints as well as (ii) the parameters of the relative motion of the camera(s) employed to acquire the images, according to an optimality criterion involving the corresponding image projections of all points. In bundle adjustment the reprojection error between the image locations of observed and predicted image points may be minimized.

In the tracking system, all points detected in the first keyframe may be set to have a distance of unity from the camera center. As the camera moves, the depth of all points and the relative pose may be continuously updated. Points move forward and backwards along rays originating from the first camera center and passing through the respective observations in the first keyframe. Accordingly, only a single parameter per point may be estimated, which makes the method efficient enough to run in real time on a mobile phone or UD 100, for example. For each camera frame, the triangulation angle of all features may be calculated. When a feature passes a certain angle threshold, it may be marked as robust. Once enough features are robust, the method may automatically promote the current camera frame to a keyframe and initialize the map using the two keyframes.

Figure 10A:
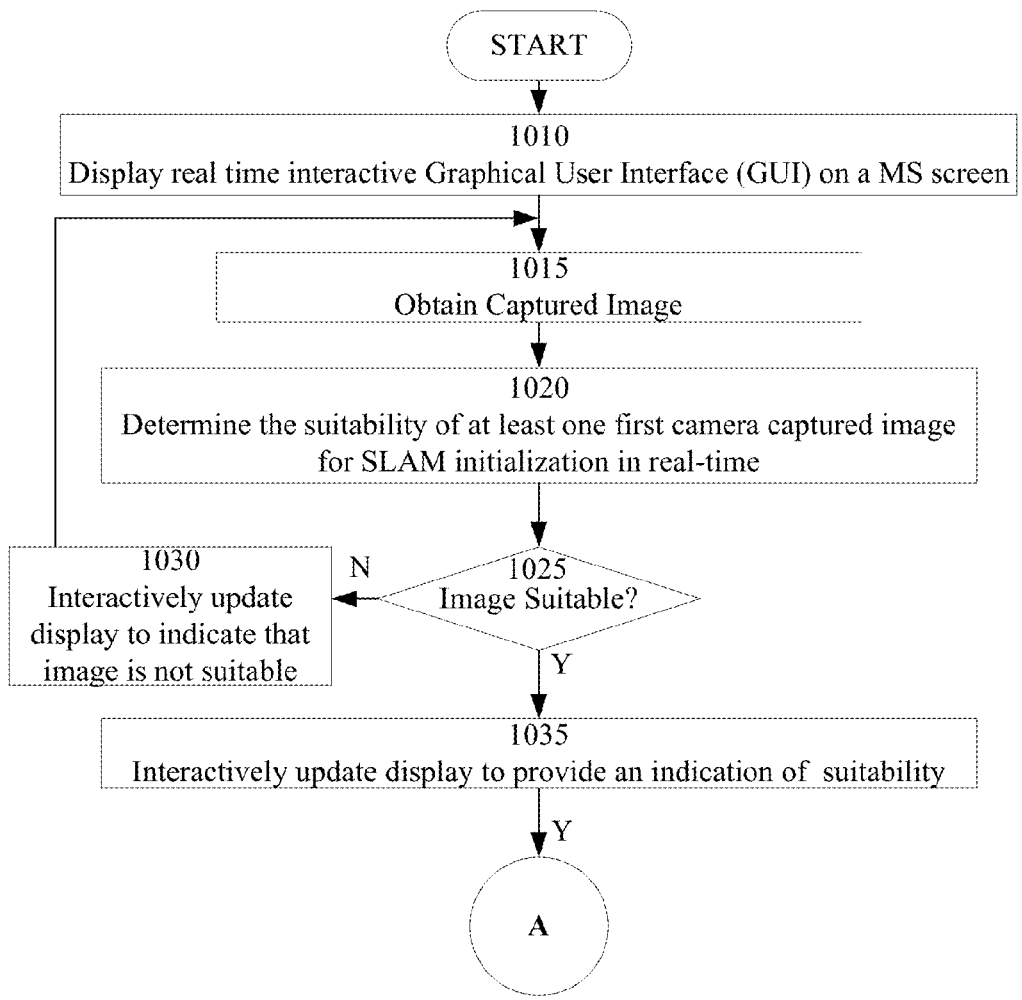
FIGS. 10A and 10B show a flowchart for an exemplary method for performing SLAM/VSLAM initialization in a manner consistent with disclosed embodiments.
Figure 10B:
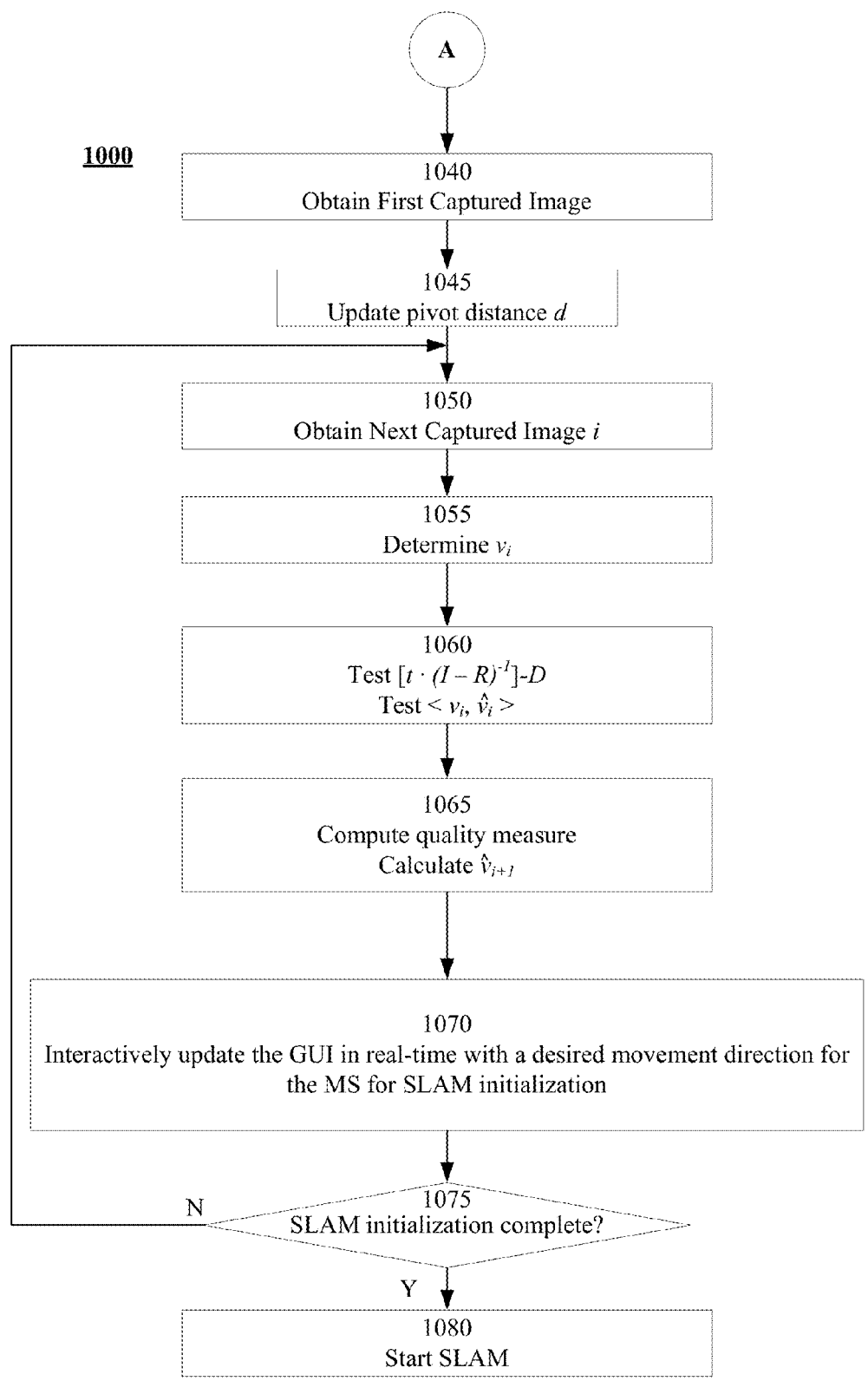

FIGS. 10A and 10B show a flowchart 1000 for an exemplary method for performing SLAM/VSLAM initialization. In some embodiments, method 1000 may be executed on user device (UD) 100 comprising camera 110 and screen 170. In some embodiments, portions of method 1000 may be performed by processor 150 and/or CV Application Initialization Module 155. Upon starting the initialization, in step 1010, a real time interactive Graphical User Interface (GUI) may be displayed on UD screen 170. Next, in step 1015, an image captured by camera 110 may be obtained.

In step 1020, the suitability of the camera captured image for SLAM initialization may be determined in real-time, for example, by processor(s) 150 on UD 100. For example, if the captured image is feature rich then the image may be determined as suitable. If the captured image lacks features then the image may be rejected as being unsuitable.

In step 1025, if the image is suitable ("Y" in step 1025), then, in step 1035, the display may be interactively updated in real-time to provide an indication of suitability. For example, the color of cylinder or another virtual object 980 shown in FIG. 9 may be changed (e.g. to green). In step 1025, if the image is unsuitable ("N" in step 1025), then, in step 1030, the display may be interactively updated in real-time to provide an indication that the image is unsuitable and another iteration may be commenced in step 1015. For example, the color of cylinder or another virtual object 980 shown in FIG. 9 may be changed (e.g. to red) and another iteration may commence at step 1015. Thus, the method in FIG. 10A may be used to establish the suitability of an image for SLAM initialization. In some embodiments, the method in FIG. 10A may be tightly integrated into an application for SLAM initialization.

If the image is determined suitable for initialization ("Y" in step 1025), then, in step 1040, the first captured image may be obtained and in step 1045, a value for the pivot distance d may be updated. In some embodiments, an initial camera position may also be estimated or assumed. For example, the initial camera position may be chosen based on an appropriate choice of world coordinate frame. As an example, the initial camera position can be set to identity pose (which may correspond to the spatial coordinate system) and/or may be chosen based on the accelerometer readings (i.e. the Z axis of the spatial frame may coincide with the measured vertical direction). In general, the initial camera pose may be assumed and/or estimated in various ways without impacting subsequent steps in method 1000.

Further, the value d may be updated based on an arbitrary value such that d>0 (e.g. d=1). In some embodiments, d may be updated based on the average distance of observed feature points from the camera 110 and/or UD 100. In some embodiments, d may be updated as an arbitrarily large value above some fixed threshold. When larger values of d are used, the trajectory approximates a sideward translation. In some embodiments, the value of d may be selected based on user settings or settings in a CV or AR application, for which the initialization is being performed. For example, if the user has selected a translation motion sequence for initialization, then, a large value of d, above a translation threshold may be used.

In step 1050, the next camera-captured image i may be obtained. Next, in step 1055, $v_i$ may be determined as $v_i=[t_x\ t_y\ t_z\ r_x\ r_y\ r_z]$, for the next/current image i.

In step 1060, the value $t\cdot(I-R)^{-1}$ may be determined and it may be determined whether pose C constitutes a rotation around the desired pivot by verifying if $[t\cdot(I-R)^{-1}-D]$ is below some threshold. In some embodiments, the value of $[t\cdot(I-R)^{-1}]-D$ may be checked to determine if it falls within some predetermined constraints or within a range of some selected value. If the value $[t\cdot(I-R)^{-1}]-D$ does not fall within the predetermined constraints then an error indication or appropriate corrective action may be displayed to the user. In some embodiments, the error indication or corrective action may be provided as part of a quality indication/measure for the current trajectory.

Further, in step 1060, $\langle v_i, \hat{v}_i \rangle$ may be tested, where, as earlier, $v_i$ is based on the actual trajectory, which may be computed based on the pose determined for current image i and $\hat{v}_i$ is based on a previously determined optimal trajectory, which may be computed based on an immediately prior frame.

In some embodiments, in step 1065, a quality measure is determined for the current trajectory. For example, a camera pose calculated based on the current frame is then compared to the camera pose prediction for an optimal trajectory done in the previous frame. In some embodiments, the quality measure may be based on the test $\langle v_i, \hat{v}_i \rangle$ and/or the test $[t\cdot(I-R)^{-1}]-D$. Further, in some embodiments, in step 560, $\hat{v}_{i+1}$ may be determined based on the current pose.

In step 1070, the GUI may be interactively updated in real-time to provide an indication of: (i) a desired movement direction for the UD for CV/MVG application/SLAM initialization based on the current camera pose estimated from currently captured image i, desired/computed optimal trajectory, which may be based on $\hat{v}_{i+1}$; and/or (ii) an indication of quality for current camera trajectory, which may be based on the test $\langle v_i, \hat{v}_i \rangle$ and/or the test $[t \cdot (I-R)^{-1}]-D$. The current camera pose may be determined by the tracker based, in part, on the currently captured camera image. One or more of the techniques shown in FIGS. 3 through 8 may be used to provide an indication of a desired movement direction for the UD for SLAM initialization. In some embodiments, objects augmented on screen may be color coded to provide an indication of current trajectory quality.

In step 1075, if CV/MVG/SLAM initialization has been completed ("Y" in step 1075), then, in step 1080, the CV/MVG/SLAM process may begin. For example, if a large enough baseline has been obtained, the CV/MVG/SLAM process may begin in step 1080. Otherwise, the next iteration is started at step 1050.

While flowchart 1000 illustrates procedures for SLAM/VSLAM initialization, the method may be used with other various other mapping or computer-vision functions, procedures, and/or applications. Thus, SLAM initialization is just one potential embodiment and embodiments other than SLAM may be implemented. Similarly, while FIGS. 3-8 may have been described above using SLAM/VSLAM initialization as an exemplary application, the processes and embodiments discussed in the related description of FIGS. 3-8 may be used with other various other mapping and/or computer-vision functions, procedures, and/or applications.

Figure 11:
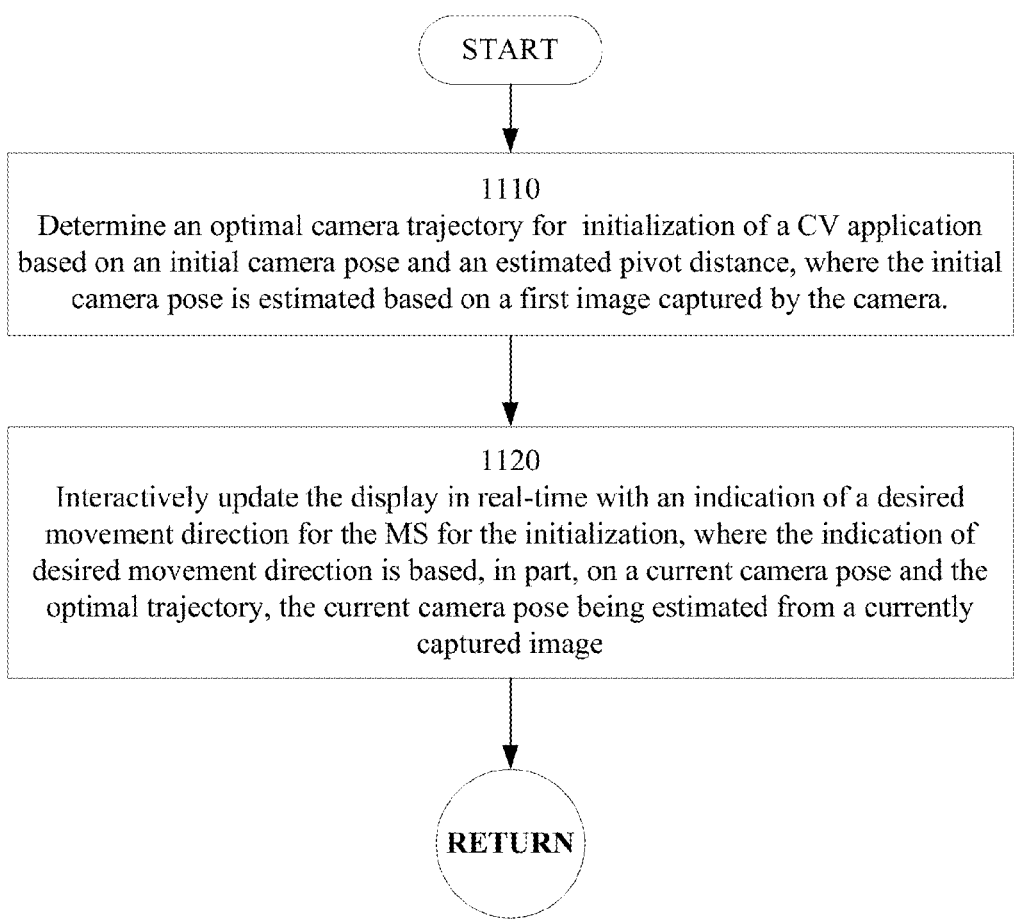
FIG. 11 shows a flowchart for an exemplary method 1100 for performing SLAM/VSLAM initialization in a manner consistent with disclosed embodiments.

FIG. 11 shows a flowchart for an exemplary method 1100 for performing SLAM/VSLAM initialization in a manner consistent with disclosed embodiments. In some embodiments, method 1100 may be performed on UD 100 using camera 110 and display 170.

In step 1110, an optimal camera trajectory for initialization of a Computer Vision (CV) application may be determined. In some embodiments, the optimal trajectory may be determined based on an initial camera pose and an estimated pivot distance, where the initial camera pose may be estimated based on a first image captured by the camera 110. In some embodiments, the pivot distance may be determined as at least one of: an arbitrary positive value; an average distance of observed feature points in the first image; or a value above a threshold, which, in some instances may be a translation threshold.

In some embodiments, prior to determining an optimal camera trajectory, the suitability of a camera captured image for initialization may be determined based, in part, on the number of feature points in the camera captured image, and the camera captured image may be selected as the first image, when the camera captured image is determined to be suitable for initialization. In some embodiments, upon selection of the first image, an indication of suitability of the first image for initialization may be provided by augmenting a display of the camera captured image with a first virtual object. In some embodiments, an indication of unsuitability of the camera captured image for initialization may be provided by augmenting a display of the camera captured image with a second virtual object and/or by altering displayed visual characteristics associated with the first virtual object. The indication of the suitability or unsuitability may be provided through an interactive Graphical User Interface (GUI) displayed on display 170.

Next, in step 1120, display 170 may be updated in real-time with an indication of a desired movement direction for camera 110/UD 100, and the indication of desired movement direction may be based, in part, on a current camera pose and the optimal trajectory, where the current camera pose is estimated based on a current image captured by camera 110. In some embodiments, the desired movement direction for the camera may be obtained based in part, on a comparison of a current trajectory of the camera with the optimal trajectory of the camera, the current trajectory of the camera being determined from a sequence of prior camera poses. In some embodiments, the display may be further updated in real-time with a sequence of indications of updated desired movement directions for the camera. For example, each desired movement direction in the sequence may be updated based, in part, on a corresponding camera pose associated with further movement of the camera.

In some embodiments, the indication of movement direction may be provided using at least one of: a Screen-aligned 2-Dimensional (2D) guidance scheme comprising 2D screen aligned UI elements to provide the indication of movement direction; or a Screen-aligned 3-Dimensional (3D) guidance scheme comprising 3D screen aligned UI elements to provide the indication of movement direction; or a World aligned 3D guidance scheme, comprising 3D UI elements aligned to real world objects to provide the indication of movement direction or a World aligned 2.5-Dimensional (2.5-D) guidance scheme, comprising UI elements displayed in 2.5-D, the UI elements aligned to real world objects to provide the indication of movement direction.

In some embodiments, the indication of desired movement direction may be provided for both sideward translational and pivot initialization motion sequences. In some embodiments, the indication of desired movement direction may comprise an indication of past movement and an indication of a preferred future movement direction. In some embodiments, the indication of desired movement direction may also indicate rotational movement of the camera. In some embodiments, the indication of desired movement direction may indicate both the desired trajectory and a correction to current trajectory. Further, in some implementations, at least one of auditory and/or tactile feedback may be provided to the user in conjunction with the indication of desired movement direction.

In some embodiments, a measure of quality of a current trajectory of the camera may also be provided. For example, the current trajectory of the camera may be determined based, in part, on the current camera pose and a sequence of prior camera poses, and the measure of quality may be based on a comparison of the current trajectory with the optimal trajectory.

The methodologies described herein may be implemented by various means depending upon the application. For example, for a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. In some embodiments, the functions may be stored as one or more instructions or code on a computer-readable medium. Examples include computer-readable media encoded with a data structure and computer-readable media encoded with a computer program. Computer-readable media includes physical computer storage media.

A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method on a user device (UD) comprising a camera and a display, the method comprising:
   determining a trajectory of the camera for targetless initialization of a Computer Vision (CV) application based, in part, on an initial camera pose and an estimated pivot distance between the camera and a pivot position, wherein the initial camera pose is estimated based on a targetless first image captured by the camera; and
   updating the display in real-time with an indication of a desired movement direction for the camera, the indication of the desired movement direction being based, in part, on a current camera pose and the trajectory of the camera, wherein the current camera pose is estimated based on a current image captured by the camera.

2. The method of claim 1, wherein the desired movement direction for the camera is obtained based in part, on a comparison of a current trajectory of the camera with the trajectory of the camera, the current trajectory of the camera being determined from a sequence of prior camera poses.

3. The method of claim 1, further comprising:
   updating the display in real-time upon a movement of the camera with one or more additional indications of desired movement directions for the camera, wherein each additional indication of desired movement direction is based, in part, on a corresponding additional camera pose associated with the movement of the camera.

4. The method of claim 1, wherein the pivot distance is determined as at least one of:
   an arbitrary positive value;
   an average distance of a subset of observed feature points in the first image;
   a value above a threshold.

5. The method of claim 1, further comprising:
   computing a measure of quality of a current trajectory of the camera, the current trajectory of the camera being determined based, in part, on the current camera pose and a sequence of prior camera poses, and wherein the measure of quality is based on a comparison of the current trajectory of the camera with the trajectory of the camera; and
   displaying an indication of the measure of quality of the current trajectory of the camera.

6. The method of claim 1, wherein determining the trajectory of the camera, comprises:
   selecting the first image from one or more camera captured images based, in part, on a number of feature points in the one or more camera captured images.

7. The method of claim 6, further comprising:
   providing, upon selection of the first image, an indication of suitability of the first image for initialization by displaying a first virtual object; or
   providing an indication of unsuitability for initialization of the one or more captured images by displaying a second virtual object.

8. The method of claim 1, wherein the indication of the desired movement direction is provided using at least one of:
   a Screen-aligned 2-Dimensional (2D) guidance scheme comprising 2D screen aligned UI elements to provide the indication of the desired movement direction; or
   a Screen-aligned 3-Dimensional (3D) guidance scheme comprising 3D screen aligned UI elements to provide the indication of the desired movement direction; or
   a World aligned 3D guidance scheme, comprising 3D UI elements aligned to real world objects to provide the indication of the desired movement direction; or
   a World aligned 2.5-Dimensional (2.5-D) guidance scheme, comprising UI elements displayed in 2.5-D, the UI elements aligned to real world objects to provide the indication of the desired movement direction.

9. The method of claim 1, wherein the indication of the desired movement direction is provided for both sideward translational and pivot initialization motion sequences.

10. The method of claim 1, wherein the indication of the desired movement direction comprises an indication of past movement and an indication of a preferred future movement direction.

11. The method of claim 1, wherein the indication of the desired movement direction also indicates rotational movement of the camera.

12. The method of claim 1, further comprising:
   providing at least one of an auditory feedback or a tactile feedback to a user in conjunction with the indication of the desired movement direction.

13. A user device (UD) comprising:
   an image sensor to capture a sequence of images;
   a display, and
   a processor coupled to the image sensor and the display, wherein the processor is configured to:
      determine a trajectory of the image sensor for targetless initialization of a Computer Vision (CV) application based on an initial image sensor pose and an estimated pivot distance between the image sensor and a pivot position, wherein the initial image sensor pose is estimated based on a targetless first image captured by the image sensor, and
      update the display in real-time with an indication of a desired movement direction for the image sensor, the indication of the desired movement direction being based, in part, on a current image sensor pose and the trajectory of the image sensor, wherein the current image sensor pose is estimated based on a current image captured by the image sensor.

14. The UD of claim 13, wherein to obtain the desired movement direction for the image sensor, the processor is configured to:
compare the trajectory of the image sensor with a current trajectory of the image sensor, the current trajectory of the image sensor being determined from a sequence of prior image sensor poses.

15. The UD of claim 13, the processor is further configured to:
update the display in real-time upon a movement of the image sensor with a one or more additional indications of desired movement directions for the image sensor, wherein each additional indication of desired movement direction is based, in part, on a corresponding additional image sensor pose associated with the movement of the image sensor.

16. The UD of claim 13, wherein the processor is configured to:
determine the pivot distance as at least one of:
an arbitrary positive value;
an average distance of observed feature points in the first image;
a value above a threshold.

17. The UD of claim 13, wherein the processor is further configured to:
compute a measure of quality of a current trajectory of the image sensor, the current trajectory of the image sensor being determined based, in part, on the current image sensor pose and a sequence of prior image sensor poses, and wherein the measure of quality is based on a comparison of the current trajectory of the image sensor with the trajectory of the image sensor; and
display an indication of the measure of quality of the current trajectory of the image sensor.

18. The UD of claim 13, wherein to determine a trajectory of the image sensor, the processor is configured to:
select the first image from one or more image sensor captured images based, in part, on a number of feature points in the one or more image sensor captured images.

19. The UD of claim 18, wherein the processor is further configured to:
provide, upon selection of the first image, an indication of suitability of the first image for initialization by displaying a first virtual object; or
provide an indication of unsuitability of the one or more captured images for initialization by displaying a second virtual object.

20. The UD of claim 13, wherein the indication of the desired movement direction is provided using at least one of:
a Screen-aligned 2-Dimensional (2D) guidance scheme comprising 2D screen aligned UI elements to provide the indication of the desired movement direction; or
a Screen-aligned 3-Dimensional (3D) guidance scheme comprising 3D screen aligned UI elements to provide the indication of the desired movement direction; or
a World aligned 3D guidance scheme, comprising 3D UI elements aligned to real world objects to provide the indication of the desired movement direction; or
a World aligned 2.5-Dimensional (2.5-D) guidance scheme, comprising UI elements displayed in 2.5-D, the UI elements aligned to real world objects to provide the indication of the desired movement direction.

21. The UD of claim 13, wherein the indication of the desired movement direction is provided for both sideward translational and pivot initialization motion sequences.

22. The UD of claim 13, wherein the indication of the desired movement direction comprises an indication of past movement and an indication of a preferred future movement direction.

23. The UD of claim 13, wherein the indication of the desired movement direction also indicates rotational movement of the UD.

24. The UD of claim 13, wherein the processor is further configured to:
cause the provision of at least one of an auditory feedback or a tactile feedback to a user in conjunction with the indication of the desired movement direction.

25. An apparatus comprising:
image capture means, the image capture means to capture a sequence of images;
display means;
means for determining a trajectory of the image capture means for targetless initialization of a Computer Vision (CV) application based on an initial pose of the image capture means and an estimated pivot distance between the camera and a pivot position, wherein the initial pose of the image capture means is estimated based on a targetless first image captured by the image capture means; and
means for updating the display means in real-time with an indication of a desired movement direction for the image capture means, the indication of desired movement direction being based, in part, on a current pose of the image capture means and the trajectory of the image capture means, wherein the current pose of the image capture means is estimated based on a current image captured by the image capture means.

26. The apparatus of claim 25, wherein means for updating the display means comprises:
means for obtaining the desired movement direction for the image sensor, wherein the means for obtaining the desired movement direction for the image sensor comprises:
means for comparing the trajectory of the image capture means with a current trajectory of the image capture means, the current trajectory of the image capture means being determined from a sequence of prior image capture means poses.

27. The apparatus of claim 21, wherein the indication of the desired movement direction is provided using at least one of:
a Screen-aligned 2-Dimensional (2D) guidance scheme comprising 2D screen aligned UI elements to provide the indication of the desired movement direction; or
a Screen-aligned 3-Dimensional (3D) guidance scheme comprising 3D screen aligned UI elements to provide the indication of the desired movement direction; or
a World aligned 3D guidance scheme, comprising 3D UI elements aligned to real world objects to provide the indication of the desired movement direction; or
a World aligned 2.5-Dimensional (2.5-D) guidance scheme, comprising UI elements displayed in 2.5-D, the UI elements aligned to real world objects to provide the indication of the desired movement direction.

28. A non-transitory computer-readable medium comprising instructions, which, when executed by a processor, perform a method on a user device (UD) comprising a camera and a display, the method comprising:

determining a trajectory of a camera for targetless initialization of a Computer Vision (CV) application based on an initial camera pose and an estimated pivot distance between the camera and a pivot position, wherein the initial camera pose is estimated based on a targetless first image captured by the camera; and updating the display in real-time with an indication of a desired movement direction for the camera, the indication of the desired movement direction being based, in part, on a current camera pose and the trajectory of the camera, wherein the current camera pose is estimated based on a current image captured by the camera.

29. The computer-readable medium of claim 28, wherein the desired movement direction for the camera is obtained based in part, on a comparison of a current trajectory of the camera with the trajectory of the camera, the current trajectory of the camera being determined from a sequence of prior camera poses.

30. The computer-readable medium of claim 28, wherein the indication of the desired movement direction is provided using at least one of:

- a Screen-aligned 2-Dimensional (2D) guidance scheme comprising 2D screen aligned UI elements to provide the indication of the desired movement direction; or
- a Screen-aligned 3-Dimensional (3D) guidance scheme comprising 3D screen aligned UI elements to provide the indication of the desired movement direction; or
- a World aligned 3D guidance scheme, comprising 3D UI elements aligned to real world objects to provide the indication of the desired movement direction; or
- a World aligned 2.5-Dimensional (2.5-D) guidance scheme, comprising UI elements displayed in 2.5-D, the UI elements aligned to real world objects to provide the indication of the desired movement direction.

* * * * *